(12) United States Patent
Alrabady et al.

(10) Patent No.: US 7,251,473 B2
(45) Date of Patent: Jul. 31, 2007

(54) SYSTEM AND METHOD FOR CONTROLLING ACCESS TO MOBILE DEVICES

(75) Inventors: Ansaf I. Alrabady, Livonia, MI (US); Rami I. Debouk, Dearborn, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 19 days.

(21) Appl. No.: 11/208,213

(22) Filed: Aug. 19, 2005

(65) Prior Publication Data

US 2007/0040706 A1 Feb. 22, 2007

(51) Int. Cl.
*H04M 1/66* (2006.01)
(52) U.S. Cl. .............. 455/411; 455/412.1; 455/412.2; 455/414.1; 455/414.2; 455/418; 455/438; 340/991; 340/426.16; 340/426.1
(58) Field of Classification Search .............. 455/411, 455/412.1, 412.2, 414.1, 414.2, 418, 438; 340/991, 426.16, 426.1
See application file for complete search history.

(56) References Cited

U.S. PATENT DOCUMENTS

| 2004/0137877 A1* | 7/2004 | Crowhurst et al. ......... 455/411 |
| 2004/0178880 A1* | 9/2004 | Meyer et al. .............. 340/5.22 |
| 2007/0043489 A1* | 2/2007 | Alrabady et al. ............. 701/36 |

* cited by examiner

*Primary Examiner*—Joseph Feild
*Assistant Examiner*—Khai Nguyen

(57) ABSTRACT

A system and method for controlling access to, and especially protecting against unauthorized attempts to provide input to, e.g., program, or elicit output from, a vehicular or other mobile device (14), such as an electronic control unit (ECU), wherein a determined location of the device (14) or an inputted user acknowledgment provides a basis or an additional basis for allowing or denying the attempt at access.

12 Claims, 3 Drawing Sheets

SYSTEM AND METHOD FOR CONTROLLING ACCESS TO MOBILE DEVICES

TECHNICAL FIELD

The present invention relates to systems and methods for controlling access to vehicular or other mobile devices. More specifically, the present invention concerns a system and method for controlling access to, and especially protecting against unauthorized attempts to provide input to, e.g., program, or elicit output from, a vehicular or other mobile device, such as an electronic control unit, wherein a determined location of the device or an inputted user acknowledgment provides a basis or an additional basis for allowing or denying the attempt at access.

BACKGROUND OF THE INVENTION

In the prior art, programming a vehicle's electronic control unit (ECU) requires that the vehicle be present at an authorized location (e.g., a manufacturing or assembly facility, a dealership, or an authorized repair facility) and directly hardwired to a programming tool. Recently, remote wireless programming of ECUs has been introduced, which allows for greater programming flexibility. With this change, security has shifted from physical mechanism& to password and cryptographic authentication mechanisms for controlling access. Unfortunately, the security afforded by password and cryptographic access-control mechanisms does not provide a sufficiently high level of assurance against malicious attacks, such as, for example, the communication of viruses or other harmful or undesired programs to ECUs.

It will be appreciated that this concern extends to both providing input to ECUs or other vehicular devices as well as eliciting output from such devices. Thus, for example, toll booths or parking garages might be adapted to wirelessly query vehicles for identification or even for payment information but, as mentioned, password and cryptographic mechanisms do not afford sufficient security against the illicit collection of such information.

It will also be appreciated that this concern extends to a variety of other programmable or otherwise accessible mobile devices including, for example, mobile telephones and mobile computing devices.

Thus, an improved access-control mechanism is needed to more effectively control access to vehicular or other mobile devices.

SUMMARY OF THE INVENTION

The present invention provides a system and method for controlling access to, and especially protecting against unauthorized attempts to provide input to, e.g., program, or elicit output from, a vehicular or other mobile device, such as an ECU, wherein a determined location of the device or an inputted user acknowledgment provides a basis or an additional basis for allowing or denying the attempt at access.

In a first preferred embodiment the present invention provides a system and method of using location to authorize an attempt to provide input to or elicit output from a mobile device, such as an ECU which is onboard a vehicle, wherein the determined location of the device provides a basis for allowing or denying the attempt at access. In the vehicle, a gateway is provided connected to or otherwise having access to a GPS or other location-determining device or technology and a location database of authorized locations. When the gateway detects an attempt to access the ECU the gateway requests the vehicle's current location from the GPS device and compares the current location with entries in the location database. If the current location does not correspond to an entry in the location database, indicating that the vehicle is not at an authorized location, then the gateway denies access.

In a second preferred embodiment the present invention provides a system and method of using a user acknowledgement to authorize an attempt to provide input to or elicit output from the ECU. The user acknowledgement preferably takes the form of one or more input actions entered by a first party, such as the owner of the vehicle, in response to a request, notice, or other communication or indication by a second party, such as a technician in a remote repair facility, desiring access. In the vehicle, the gateway is provided connected to or otherwise receiving input from one or more conventional vehicular input mechanisms, such as, for example, a brake pedal, an accelerator pedal, a horn, a steering wheel, a turn signal switch, or an emergency flasher switch, and an action database of authorized input actions. The gateway receives the inputted user acknowledgement from the conventional vehicular input mechanisms, and compares the input actions with entries in the action database. If the input actions are not provided or do not correspond to an entry in the action database, indicating that the party attempting access is not authorized for such access, then the gateway denies access.

In both embodiments, the authorization mechanism of the present invention is preferably used in conjunction with one or more other independent access-control mechanisms, such as physical, password, or cryptographic authentication mechanisms, which may be encountered and must be satisfied either or both before or after the access-control mechanism of the present invention in order to gain access to a device.

These and other features of the present invention are discussed in greater detail in the section below titled DESCRIPTION OF THE PREFFERED EMBODIMENT (S).

BRIEF DESCRIPTION OF THE DRAWINGS

A preferred embodiment of the present invention is described in detail below with reference to the attached drawing figures, wherein:

FIG. 4 is a series of steps in a second preferred embodiment of the method of the present invention.

DESCRIPTION OF THE PREFERRED EMBODIMENT(S)

With reference to the figures, a system and method is herein described and otherwise disclosed in accordance with a preferred embodiment of the present invention. Broadly, the present invention concerns a system and method for controlling access to, and especially protecting against unauthorized attempts to provide input to or elicit output from, a vehicular or other mobile device, wherein a determined location of the device or inputted user acknowledgment provides a basis or an additional basis for allowing or denying the attempt at access. Though described hereafter in terms of a vehicular device located onboard or otherwise associated with a vehicle, it should be understood that the present invention can be used to control access to substantially any mobile device, such as a mobile telephone or a mobile computing device (e.g., laptop, notebook, personal digital assistant).

In a first preferred embodiment the present invention provides a system and method of using location to authorize an attempt to provide input to or elicit output from a device, such as an ECU, which is onboard or otherwise physically associated with a vehicle, such as a car or truck, wherein the determined location of the vehicle provides a basis for allowing or denying the attempt at access. Preferably, the access-control mechanism of the present invention is used to supplement one or more other independent access-control mechanisms, such as physical, password, or cryptographic authentication mechanisms, rather than as a stand-alone alternative to those mechanisms. More specifically, the authorization mechanism of the present invention is preferably combined with one or more authentication mechanisms of the prior art in order to even more effectively control access. Thus, for example, accessing a particular device may require both that the party attempting to access the device provide a correct password and that either the vehicle, the device, or the party attempting to access the device be located at an authorized location such as, e.g., a manufacturing or assembly facility, dealership, or authorized repair facility. Also, the present invention may be used to control access for either or both hardwired or wireless processes requiring access to the device.

Figure 1:
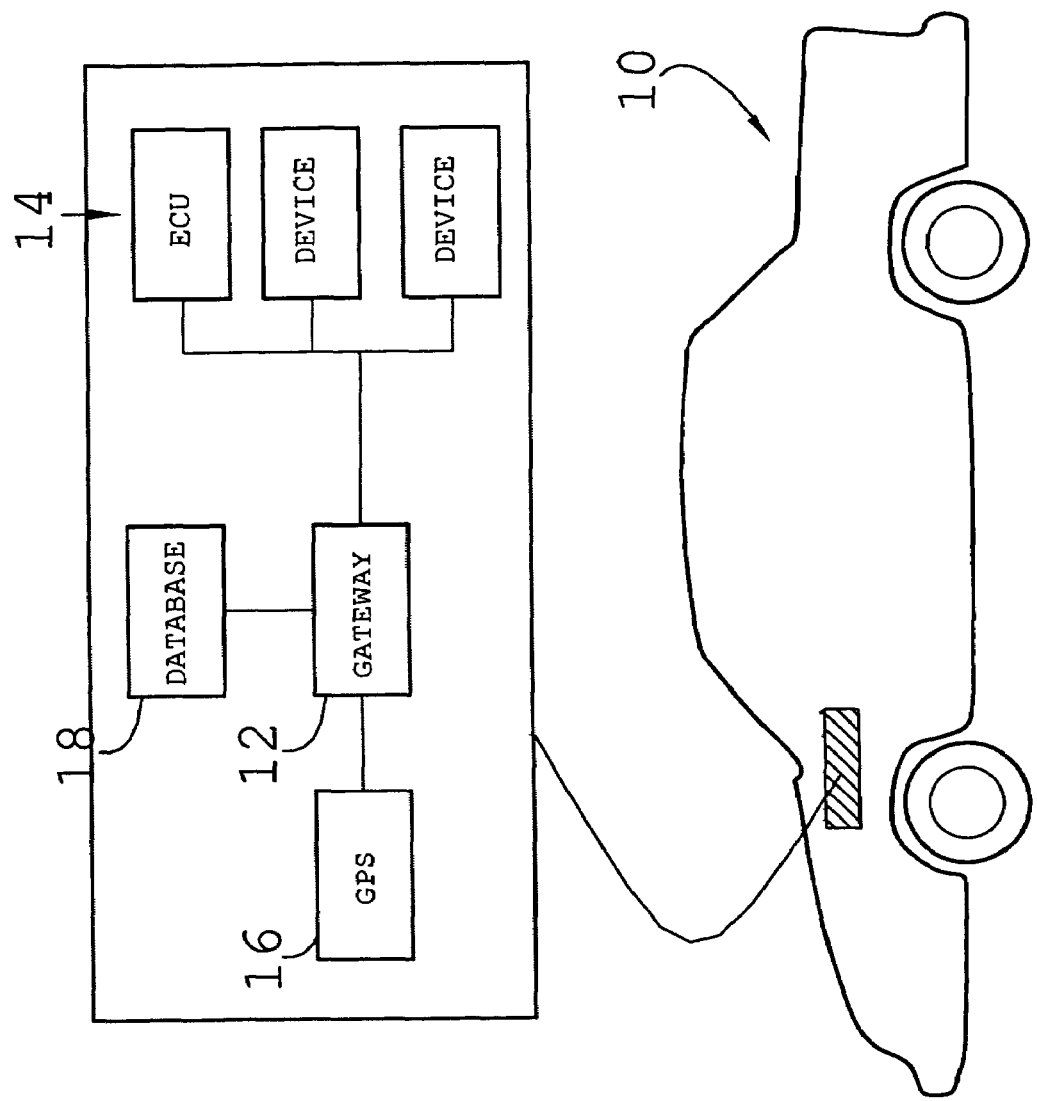
FIG. 1 is a depiction of a first preferred embodiment of the system of the present invention.
Figure 2:
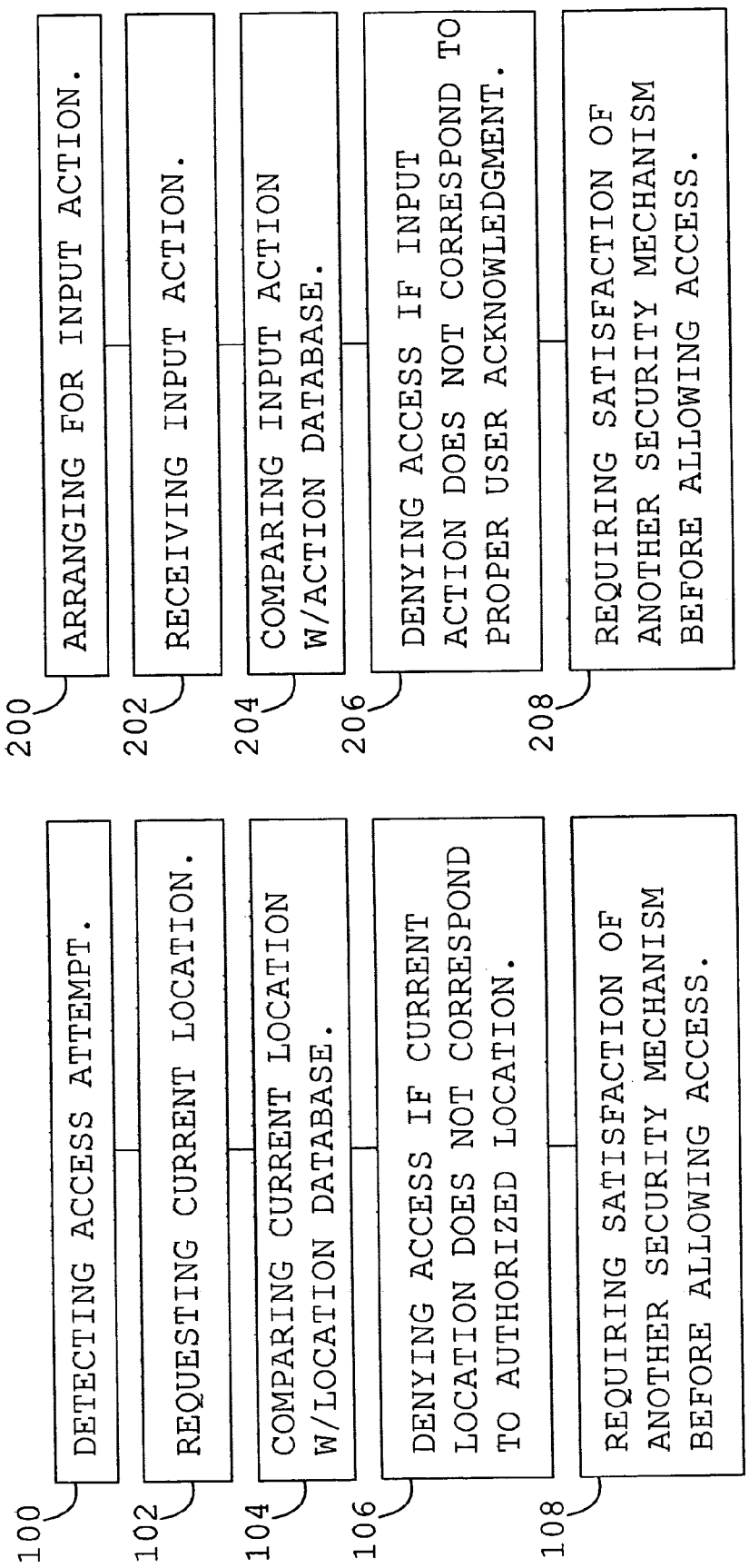
FIG. 2 is a series of steps in a first preferred embodiment of the method of the present invention.

Referring to FIGS. 1 and 2, the first preferred embodiment of the system and method may be broadly configured and implemented as follows. In the vehicle 10, a gateway 12, which may be implemented in hardware, software, firmware, or some combination thereof, and which controls access to one or more ECUs or other devices 14, is provided connected to or otherwise having access to a GPS or other location-determining device 16 or technology and a location database 18 of authorized locations. When the gateway 12 detects an attempt to access the ECU 14, as indicated by box 100, whether for input or output purposes, the gateway 12 requests the vehicle's current location from the GPS device 16, as indicated by box 102, and compares the current location with entries in the location database 18, as indicated by box 104. If the current location does not correspond to an entry in the location database 18, indicating that the vehicle is not at an authorized location, then the gateway 12 denies access, as indicated by box 106.

As mentioned, the access-control mechanism of the present invention is preferably used in conjunction with one or more other access-control mechanisms which may be encountered and must be satisfied, as indicated by box 108, either or both before or after the mechanism of the present invention. Thus, for example, the party attempting to gain access to the vehicular device 14 may be required, before access is granted, to enter a password either or both before or after the gateway 12 has determined that the device 14 is at a location authorized to make the requested access.

It will be appreciated that the entries in the location database 18 may be categorized with respect to the type of access for which each such location entry is authorized. Thus, for example, the location of a tollbooth may be an authorized location for wirelessly eliciting identification or toll payment information but not for programming an ECU, while the location of a repair facility may be an authorized location for programming an ECU and for eliciting identification information but not for eliciting toll payment information.

In a non-limiting simplified first example of use and operation of the first preferred embodiment of the present invention, a repair technician wishing to program the vehicle's ECU 14 requests access. In response, the technician is prompted to enter a password, which he or she does. The password is authenticated. Before granting access, however, the gateway 12 requests the vehicle's current location from the GPS device 16. The gateway 12 receives the determined location and compares it to those entries in the location database 18 which are authorized for programming access. The gateway 12 determines that the current location is an authorized location and so it allows the requested access.

In a non-limiting simplified second example of use and operation of the first preferred embodiment of the present invention, a vandal wishing to introduce a virus into the vehicle's ECU 14 requests access. In response, the vandal is prompted to enter a password, which, having stolen, discerned, or otherwise discovered the password, he or she does. The password is authenticated. Before granting access, however, the gateway 12 requests the vehicle's current location from the GPS device 16. The gateway 12 receives the determined location and compares it to those entries in the location database 18 which are authorized for programming access. The gateway 12 determines that the current location is not an authorized location and so it does not grant the requested access, thereby prohibiting the vandal from introducing the virus.

In a non-limiting simplified third example of use and operation of the first preferred embodiment of the present invention, as the vehicle 10 passes a tollbooth, the tollbooth requests access to the vehicle's identification for billing or other recordkeeping purposes. Before granting access to the desired information, the gateway 12 requests the vehicle's current location from the GPS device 16. The gateway 12 receives the determined location and compares it to those entries in the location database 18 which are authorized for identification access. The gateway 12 determines that the current location is an authorized location and so it allows the requested access.

In a second preferred embodiment the present invention provides a system and method of using an inputted user acknowledgement to authorize an attempt to provide input to or elicit output from the mobile device 114. The user acknowledgement preferably takes the form of one or more input actions entered by a first party in response to a request, notice, or other communication or indication by a second party desiring access, wherein the input action is provided using one or more of the device's conventional input mechanisms, such as, for example, pedals, switches, buttons, or keys, and wherein the received input actions provide a basis for allowing or denying the attempt at access. It is contemplated, for example, that the first party may be an owner of the vehicle and the second party may be a technician at a remote repair facility desiring to program the ECU, in which case the owner would provide the input action in response to a prior or substantially simultaneous communication by the technician. It is also contemplated that the first party and the second party may be the same, e.g., the vehicle would be available to the technician so that he or she could provide the input action to authorize his or her own access. In one contemplated implementation, performance of the input action places the device at issue in a particular "mode" (e.g., input mode, output mode, program mode, information mode) which determines the type or types of access that are authorized. Preferably, the access-control mechanism of the present invention is used to supplement one or more other independent access-control mechanisms, such as physical, password, or cryptographic authentication mechanisms, rather than as a stand-alone alternative to those mechanisms. More specifically, the authorization mechanism of the present invention is preferably combined with one or more authentication mechanisms of the prior art in order to even more effectively control access. Thus, for example, accessing a particular device may require both that the second party attempting to access the device provide a correct password and that the first party enter the proper input action to indicate that the second party is trustworthy. Also, the present invention may be used to control access for either or both hardwired or wireless processes requiring access to the device.

Figure 3:
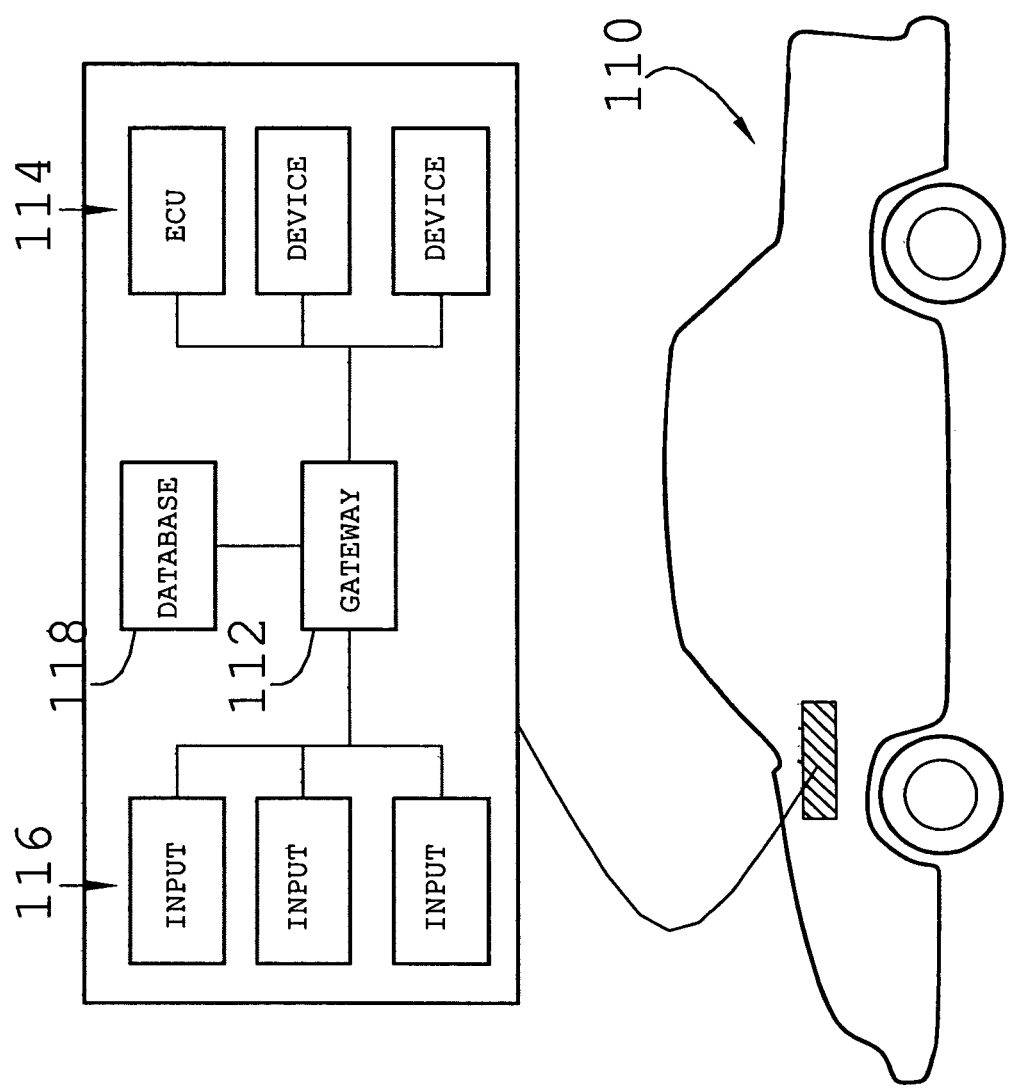
FIG. 3 is a depiction of a second preferred embodiment of the system of the present invention.

Referring to FIGS. 3 and 4, the second preferred embodiment of the present invention may be broadly configured and implemented as follows. In the vehicle 110, the gateway 112, for controlling access to one or more ECUs or other devices 114, is provided connected to or otherwise receiving input from one or more conventional vehicular input mechanisms 116, such as, for example, a brake pedal, an accelerator pedal, a horn, a steering wheel, a turn signal switch, or an emergency flasher switch, and an action database 118 of authorized actions. The party desiring access to the ECU 114 arranges for the input action to be provided at a particular date and time to authorize the access, as indicated by box 200. The gateway 112 receives the input action from the conventional vehicular input mechanisms 116, as indicated by box 202, and compares the input action with entries in the action database 118, as indicated by box 204. If the input action is not provided or does not correspond to an entry in the action database 118, indicating that the party attempting access is not authorized for such access, then the gateway 112 denies access, as indicated by box 206.

As in the first preferred embodiment, the mechanism of the present invention is preferably used in conjunction with one or more other security mechanisms which may be encountered and must be satisfied, as indicated by box 208, either or both before or after the mechanism of the present invention. Thus, for example, the party attempting to gain access to the vehicular device 114 may be required, before access is granted, to enter a password either or both before or after the gateway 112 has determined that the input action indicates authorization to make the requested access.

Also as in the first preferred embodiment, it will be appreciated that the entries in the action database 118 may be categorized with respect to the type of access for which each such input entry is authorized. Thus, for example, the input action required for programming an ECU may be different than the input action required for eliciting historical operating information from the vehicle's memory.

In a non-limiting simplified example of the use and operation of the second preferred embodiment of the present invention, a repair technician at a remote location wishing to program the vehicle's ECU 114 contacts the vehicle's owner and indicates the date and time at which such access is desired, and requests that the owner provide the input action in order to authorize the access. At the appointed date and time the owner provides the input action by, for example, depressing the brake pedal for one second before turning the ignition switch to ON. The gateway 112 receives the input action and compares it to those entries in the action database which are authorized for programming access. The gateway 112 determines that the input action is proper, and therefore authorizes the access by causing the ECU 114 to enter the operational mode appropriate for the type of access. The technician is, however, still required to enter a password before achieving access, and so he or she is prompted to enter the password, which he or she does. The password is authenticated and the technician is granted access.

Although the present invention has been described with reference to the preferred embodiments illustrated in the drawings, it is noted that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:

1. A method of controlling an attempt to access an electronic control unit (14), the method comprising the steps of:
  (a) detecting at least one attempt to access the unit (14) at a gateway coupled to the device, and temporarily denying the attempt;
  (b) determining a current location of the unit (14), and communicating the current location to the gateway;
  (c) electronically comparing the determined current location to a database of authorized locations (18); and
  (d) permanently denying the attempt to access the unit (14) if the determined current location does not match an entry in the database of authorized locations (18).

2. The method as set forth in claim 1, wherein the unit (14) is a vehicular device.

3. The method as set forth in claim 1, wherein the access involves providing input to the unit (14).

4. The method as set forth in claim 3, wherein the access involves programming the unit (14).

5. The method as set forth in claim 1, wherein the access involves eliciting output from the unit (14).

6. The method as set forth in claim 1, wherein an attempt at a first type of access results in comparing the determined current location with a first set of entries in the database of authorized locations (18), and an attempt at a second type of access results in comparing the determined current location with a different set of entries in the database of authorized locations (18).

7. The method as set forth in claim 6, wherein the first type of access involves programming the unit (14), and the second type of access involves eliciting output from the unit (14).

8. The method as set forth in claim 6, wherein the first type of access involves eliciting a first type of information from the unit (14), and the second type of access involves eliciting a second type of information from the unit (14).

9. The method as set forth in claim 1, further including the step of requiring satisfaction of at least one other substantially independent access-control mechanism before allowing access to the unit (14).

10. The method as set forth in claim 9, wherein said other mechanism is an electronic password or cryptographic access-control mechanism.

11. The method as set forth in claim 1, wherein the attempt to access is wireless.

12. A method of controlling an attempt to access an electronic control unit (14) in a vehicle (10), the method comprising the steps of:
  (a) autonomously detecting an attempt to access the electronic control unit (14), so as to program, elicit output from, or download content to the unit (14), and temporarily denying the attempt;

(b) autonomously determining a current location of the electronic control unit (14) at the vehicle (10);

(c) storing a database of authorized locations (18) at the vehicle (10), and electronically comparing the determined current location to the database of authorized locations (18);

(d) permanently denying the attempt to access the electronic control unit (14) if the determined current location does not match an authorized location entry in the database of authorized locations (18); and (e) permanently denying access to the unit (14) by at least one other substantially independent access-control mechanism, if the attempt does not also satisfy the mechanism.

* * * * *